P. BALL.
Water-Filter.
No. 164,510.  Patented June 15, 1875.
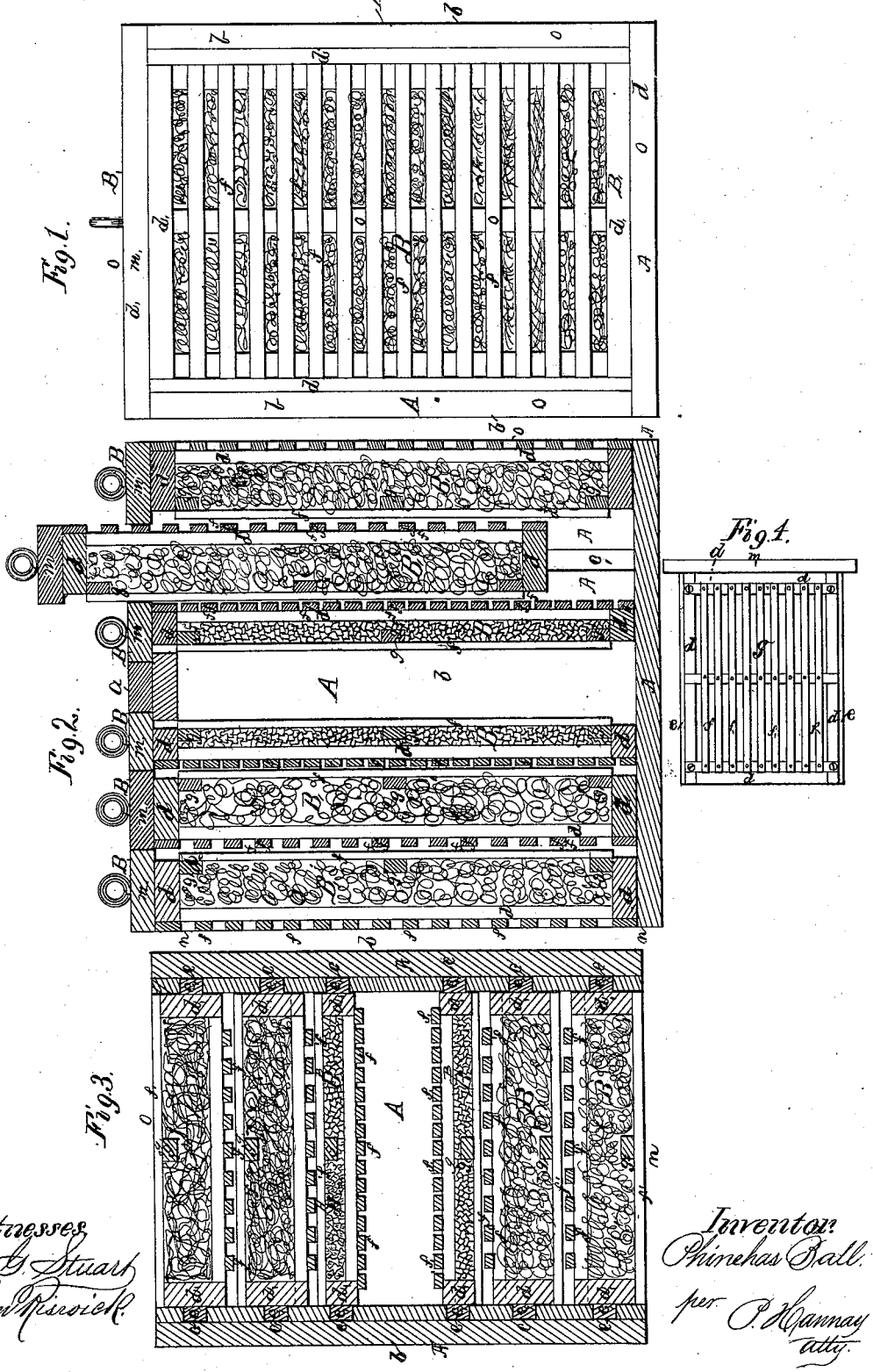

UNITED STATES PATENT OFFICE.

PHINEHAS BALL, OF WORCESTER, MASSACHUSETTS.

IMPROVEMENT IN WATER-FILTERS.

Specification forming part of Letters Patent No. 164,510, dated June 15, 1875; application filed February 25, 1875.

*To all whom it may concern:*

Be it known that I, PHINEHAS BALL, of Worcester, in the county of Worcester and State of Massachusetts, have invented certain new and useful Improvements in Water-Filters; and I do hereby declare that the following is a full, clear, and exact description thereof, which will enable those skilled in the art to which it pertains to make and use the same, reference being had to the accompanying drawings, which form a part of this specification, in which—

Figure 1 represents an elevation of the entrance end of a filter having my improvements applied thereto; Fig. 2 a vertical, and Fig. 3 a horizontal, section of the same. Fig. 4 represents a view of the inner side of one of the sections or boxes, showing its construction.

My invention relates to a new and improved apparatus adapted to the filtering and purifying of water in large quantities under very low pressure, and is more especially designed for use in connection with water-works, paper-mills, woolen-manufactories, bleacheries, &c., and for such purposes is put in rivers, streams, reservoirs, or ponds.

Heretofore the great cost of construction has been a serious drawback to the more general adoption of filters in such cases. This improvement is intended to overcome such trouble, as it enables a filter of great cubic capacity to be constructed and kept in good operative condition at a very reasonable cost.

The invention consists, first, in constructing the filter with open ends of large area for the free entrance thereto and exit therefrom of flowing water in comparatively large quantities, as contradistinguished from filters supplied with pipes under high pressure, the box thus constructed being then filled with that form of woody fiber known as "excelsior," suitably confined therein, which, being long and fibrous, mats on itself, and hence does not require the use of that close wire netting or gauze to confine it necessary to other materials for such purposes, but, on the contrary, admits of the use of confining-frames with large openings, which permit a freer passage to the water, as well as a cheaper and more durable construction; secondly, in a filter constructed with open ends of comparatively large area provided with filtering materials, which consist of shavings or the woody fiber known as excelsior, and with other materials, such as are hereinafter set forth, for the chemical purification of the water; and, thirdly, in a filter constructed with an open top and open ends, and provided with two or more sections, each capable of being independently removed to have its filtering material cleansed and restored or replaced with new material without shutting off the flow of water through any portion of the filter.

To enable others skilled in the art to make, construct, and use my invention, I will now proceed to describe its parts in detail.

The filter proper consists of a rectangular frame or box, A, open at top and ends $n$ and $o$, but closed at the sides, and preferably the bottom also. Across the top, at suitable distances apart, are secured a sufficient number of stay or cross pieces, $a$, to give the requisite strength and rigidity to the frame or box, one only being shown in the drawing. In each of the side walls $b$ of this box a series of grooves, $c$, are cut, they being made to face each other in pairs at points equidistant from the ends, the distance apart of each groove being regulated by the size of the respective sections or independent filtering-boxes to be used. These sections or filtering-boxes B consist of a rectangular frame or head, $d$, made either of wood or metal, the sides of which are each provided with a tenon, $e$, to fit and slide in the grooves $c$, formed or cut in the inner wall of the main box or frame A. To the front and rear sides of the frame $d$ is secured in any suitable manner a series of slats or laths, $f$. As a rule, where the frame $d$ is made of wood, the slats on one side will be secured to it by nails or screws, while on the other they will be secured to an independent frame, $g$, and it in turn secured by screws or bolts to frame $d$, the object of which is to make the slats readily removable from one side, that the box B may be easily emptied when the filtering material has become foul from use, and replenished with fresh material, or with the old material cleansed and restored. The boxes thus constructed are filled with such filtering materials as may be desired, the character of the material determining the closeness or proximity of the slats of the box.

Where the filter is only intended to remove the mechanical impurities held in suspension in the water, I fill the boxes B with shavings or a woody fiber known in the market as excelsior; but any other suitable material may be substituted therefor. Of these boxes as many may be used as is required to produce the desired result, the number being regulated by the size of the boxes; but from four to six as a rule will be found amply sufficient, but less or more may be used. These boxes, when filled, are then placed vertically into box A, side by side, in the manner shown in the drawings, the tenons $e$ of the boxes B fitting and sliding in the groove $c$ of box A, and which serve to keep them in place, each box being thereby made to bear its own pressure of the water. By this arrangement it will be perceived that any one or more of them may be removed for any purpose whatever without interrupting the action of those left, the upper side of each frame $d$ for this purpose being provided with hooks or other appliance, by means of which to withdraw it from the main box A of the filter.

Where, however, the water is required to be freed from organic and other impurities held in solution, then a different plan is pursued, so as to furnish it in various states of purity, according to the purpose for which it is wanted. Then such agents are used in connection with the woody fiber as will produce the required result, such as charcoal, (animal or vegetable,) sand, spongy iron, broken stone, or other suitable material. To this end the material or materials decided upon to be used may be mixed with the woody fiber in the different boxes B; or they may be used in separate or distinct boxes.

As a rule, I prefer to use the woody fiber in boxes by itself, and the other agents in boxes by themselves. Such an arrangement is shown in Fig. 2, where two boxes filled with excelsior are shown arranged at each end of the filter, while separate boxes containing animal charcoal or other purifying material are shown in the central boxes.

A filter thus made is capable of rapidly purifying water in large quantities, no matter how muddy the stream.

Such filter has been used by me for the last year in the Connecticut River to purify the water for the city of Springfield, and has performed its duty most acceptably, filtering from five hundred thousand to eight hundred thousand gallons of water daily, according to the number of hours the pumps were run.

In using the filter, it is so placed in the dam as that the heads $m$ of the boxes B will be placed slightly above the line of the water-level. By arranging boxes filled with woody fiber at the entrance end $o$ of the filter it removes the suspended matters before they are brought in contact with the chemical agents, and thus enables the latter to operate more effectively than they otherwise would by preventing them from doing double duty. The letter $n$ denotes the exit end of the apparatus, through which the water is discharged after it has been filtered. The ends of the filter, however, when provided with woody fiber at both ends, as illustrated in the drawings, may be reversed, $o$ becoming the discharge and $n$ the entrance end.

The form of the filter and its boxes, as well as the method of constructing, arranging, and removing them, may be variously modified without altering in the least the principle of my invention.

Having thus described my invention, what I claim as new is—

1. A filter constructed with open ends $n$ and $o$, and provided with shavings or the woody fiber known as excelsior, for the purpose set forth.

2. A filter constructed with open ends $n$ and $o$, and provided with one or more boxes, B, filled with shavings or the woody fiber known as excelsior, for the mechanical purification of the water, and with one or more other boxes filled with known agents for the chemical purification of the water, substantially as set forth.

3. A filter-box, A, constructed with an open top, and with open entrance and exit ends $o$ and $n$, in combination with two or more separate and independent sections, B, through which the water has uninterrupted or free access from the one to the other, and each capable of being separately removed from the filter without shutting off the flow of water or stopping the filtering process through the other, substantially as and for the purpose set forth.

4. A removable filtering-box, B, consisting of a slatted frame, $d$, and cap-piece $m$, substantially as set forth.

5. A removable filtering-box, B, consisting of frame-head $d$, slatted on one side, and provided with a removable slatted cover, $g$, substantially as and for the purpose set forth.

6. The combination of a filter-box, A, provided with recesses $c$, with one or more removable filter-boxes, B, constructed and arranged substantially as and for the purpose set forth.

In testimony that I claim the foregoing I have hereunto set my hand.

PHINEHAS BALL.

Witnesses:
S. AUGUSTUS WELCH,
ABIEL E. WILSON.